United States Patent [19]

Ashikawa et al.

[11] Patent Number: 5,181,893
[45] Date of Patent: Jan. 26, 1993

[54] TRANSMISSION FOR VEHICLE

[75] Inventors: Noboru Ashikawa; Bunsho Yaguchi; Toyoshi Yasuda; Masami Takano; Akihito Ohhashi; Hiroyuki Shimada; Masahiro Akioka, all of Saitama, Japan

[73] Assignee: Honda Giken Kogyo Kabushiki Kaisha, Tokyo, Japan

[21] Appl. No.: 799,548

[22] Filed: Nov. 27, 1991

[30] Foreign Application Priority Data

Nov. 30, 1990 [JP] Japan .................. 2-336578
Nov. 30, 1990 [JP] Japan .................. 2-336584

[51] Int. Cl.⁵ ............................. F16H 37/08
[52] U.S. Cl. ............................. 475/203
[58] Field of Search ............... 74/333; 475/203

[56] References Cited

U.S. PATENT DOCUMENTS

| | | | |
|---|---|---|---|
| 635,171 | 10/1899 | Mathieu | 475/203 X |
| 662,400 | 11/1900 | Dyer | 475/203 X |
| 1,652,358 | 12/1927 | Heider | 475/203 |
| 2,717,521 | 9/1955 | Andershock | 475/203 X |
| 3,095,759 | 7/1963 | Herrod | 475/203 |

FOREIGN PATENT DOCUMENTS

| | | |
|---|---|---|
| 133077 | 5/1901 | Fed. Rep. of Germany . |
| 2722902 | 11/1978 | Fed. Rep. of Germany . |
| 3143301 | 5/1983 | Fed. Rep. of Germany . |
| 3925409 | 2/1991 | Fed. Rep. of Germany . |

Primary Examiner—Dirk Wright
Attorney, Agent, or Firm—Lyon & Lyon

[57] ABSTRACT

A vehicle transmission of the type having a main shaft and a parallel counter shaft with a plurality of selectable gear trains therebetween. The axis of the engine crankshaft is disposed perpendicular to intermediate portions of the main shaft and the counter shaft, with the low speed gear trains and high speed gear trains positioned on opposite lateral sides of the crankshaft. This results not only in a reduced size of the transmission in the axial direction of the crankshaft but also in a reduced lateral size of the transmission, as compared with a transmission in which the crankshaft is connected in series to the transmission main shaft. A synchro mechanism is mounted on the counter shaft and a shift drum for operating the synchro mechanism is positioned parallel to the counter shaft. This insures a space for disposition of the synchro mechanism between gears of the relatively large diameter gears on the counter shaft and ensures a smooth shifting operation, without an increase in the lateral size of the transmission due to the shift drum.

10 Claims, 12 Drawing Sheets 5,181,893

TRANSMISSION FOR VEHICLE

BACKGROUND OF THE INVENTION

1. Field of the Invention

The field of the present invention is vehicle transmissions of the type that have a shift mechanism for establishing a desired shift stage through a plurality of gear trains interposed between a main shaft and a counter shaft, and a synchro mechanism for synchronizing the number of revolutions of the shafts for establishing the shift stage.

2. Description of the Prior Art

In a conventional vehicle transmission, the arrangement of the main shaft and the counter shaft relative to the crankshaft of the engine is generally such that the main shaft is coaxially connected to one end of the crankshaft through a clutch, and the counter shaft is disposed in parallel to the main shaft (see U.S. Pat. No. 4,817,451, for example). This results in a disadvantage that the size of the transmission in an axial direction of the crankshaft is necessarily increased which impedes the freedom of mounting the transmission in the vehicle.

SUMMARY OF THE INVENTION

Accordingly, it is an object of the present invention to provide a more compact arrangement of the engine crankshaft and the main and counter shafts of the transmission to reduce the size of the transmission in the axial direction of the crankshaft and to make the clutch and oil supply device mounted in the transmission more compact to provide a further reduction in size.

To achieve the above object, according to the present invention, there is provided a transmission for a vehicle, comprising a main shaft to which the rotation of the crankshaft is transmitted, a counter shaft disposed in parallel to the main shaft, a plurality of gear trains interposed between the main shaft and the counter shaft, a shift mechanism for connecting the shafts by any of the gear trains for establishing a desired shift stage, and a synchro mechanism for synchronizing the number of revolutions of both shafts when the shift stage is established, wherein the main shaft and the counter shaft are disposed perpendicular to the axis of the crankshaft. With this construction, the main shaft and the counter shaft are disposed perpendicular to the axis of the crankshaft and therefore, as compared with a transmission in which the crankshaft and the main shaft are aligned and interconnected in series, it is possible to reduce the size of the transmission in the axial direction of the crankshaft and increase the freedom of mounting the transmission in the vehicle.

In addition to the above first feature, it is a second feature of the present invention that the axis of the crankshaft intersects the intermediate portions of the main shaft and the counter shaft and the low speed gear trains and the high speed gear trains are divided and disposed on opposite sides of such axis. With this construction, the lengths of the main shaft and the counter shaft are divided substantially equally on laterally opposite sides of the axis of the crankshaft and therefore it is possible to reduce the lateral size of the transmission including the engine.

In addition to the first feature, it is a third feature of the present invention that the synchro mechanism is disposed on a side of the counter shaft. With this construction, the synchro mechanism is disposed on the counter shaft having a gear with a diameter larger than that of the gear on the main shaft and therefore a space for locating the synchro mechanism is easily insured. Moreover, by having the synchro mechanism on the counter shaft which is rotating slower than the main shaft, a smooth shifting operation can be conducted.

In addition to the above third feature, it is a fourth feature of the present invention that a damper for damping the shift shock produced during operation of the synchro mechanism is mounted on the clutch interposed between the crankshaft and the main shaft.

In addition to the first feature, it is a fifth feature of the present invention that the shift mechanism includes a rotatable shift drum carrying a shift fork which drives the synchro mechanism, the drum being parallel to the counter shaft. With this construction, the shift drum of the shift mechanism is disposed in parallel to and along the counter shaft and therefore, it is possible to prevent an increase in lateral size of the transmission due to the shift drum.

In addition to the fifth feature, it is a sixth feature of the present invention that the shift drum is connected at its axially intermediate portion to a drive source. With this construction, the axially intermediate portion of the shift drum is connected to and driven by the drive source and therefore the torsion of the shift drum can be reduced to achieve an accurate shifting operation. Moreover, the drive source can be received compactly within the width of a casing of the transmission without projection sideways out of the casing.

In addition to the first feature, it is a seventh feature of the present invention that the reverse shift mechanism is mounted independent of the forward shift mechanism between the main shaft and the counter shaft. With this construction, the reverse shift mechanism independent of the forward shift mechanism is mounted between the main shaft and the counter shaft and therefore it is possible to prevent an increase in lateral size of the transmission due to the reverse shift mechanism. Moreover, it is possible to improve the reliability of the shifting operation by separating the shift mechanisms.

In addition to the first feature, it is an eighth feature of the present invention that the transmission includes a clutch adapted to couple a clutch outer member mounted on the input shaft with a clutch inner member mounted on the output shaft through a clutch disk, the clutch inner member including a damper hub inner member coupled to the output shaft, and a damper hub outer member relatively rotatably carried on the damper hub inner member to transmit torque between the damper hub outer member and the clutch outer member through the clutch disks, wherein the outer peripheral surface of the damper hub inner member is connected with an inner peripheral surface of the damper hub outer member by an annular damper rubber. With this construction, if a rapid variation in torque occurs between the input and output shafts in a condition in which the clutch outer member is coupled to the clutch inner member through the clutch disks, the damper hub outer member and the damper hub inner member constituting the clutch inner member can be relatively rotated to resiliently deform the damper rubber, thereby damping the shock produced due to the variation in torque. The damper rubber comprises a single annular material piece coaxially mounted on the clutch inner member and is laid out by utilizing the internal space in the clutch outer member and therefore the contour size of the clutch will not be increased.

Moreover, the number of parts is substantially decreased as compared with the prior art using a large number of damper rubbers, thereby enabling a reduction in the number of assembling steps and a reduction in cost.

In addition to the first feature, it is a ninth feature that the transmission includes a clutch disk for transmitting the driving force between the input and output shafts, an annular diaphragm spring disposed around the axes of the input and output shafts for biasing the clutch disk in an engaging direction thereof, a release hub supported for movement along the axes and connected to an inner periphery of the diaphragm spring, a clutch for releasing the engagement of the clutch disk through the diaphragm spring by movement of the release hub, a hollow release piston slidably received in a release cylinder which is disposed around the axes of the input and output shafts, and an annular oil chamber defined between the release cylinder and the release piston and connected to a hydraulic pressure generating source, the release piston being connected to the release hub. With this construction, because the release cylinder and the release piston slidably received in the release cylinder are disposed around the axes of the input and output shafts, a compact layout of the release cylinder and the release piston can be achieved. As a result, it is possible to reduce the contour size of the clutch, as compared with the prior art transmissions having the release cylinder disposed outside of the clutch housing. Moreover, because the need for a release fork for connecting the release piston with the release hub is eliminated, not only are the number of parts and the number of assembling steps reduced, but also a further reduction in size of the clutch can be achieved because the need for a space for the release fork is eliminated.

In addition to the first feature, it is a tenth feature of the present invention that the transmission includes a pair of coaxially juxtaposed pumps connected to a shaft connected to the crankshaft to supply lubricating oil from an oil reservoir formed at the lower portion of a transmission case to each of those portions in the transmission case which are to be lubricated and a pair of strainers which are connected to the pumps, respectively, and disposed in the oil reservoir at a distance from each other in either the longitudinal or lateral direction of the vehicle. With this construction, because the pair of coaxially juxtaposed pumps are connected to the shaft connected to the crankshaft and the pair of strainers connected to the pumps are disposed in the oil reservoir at a distance from each other in either the longitudinal or lateral direction of the vehicle, it is ensured that even if the lubricating oil is moved longitudinally or laterally, depending upon the operational condition of the vehicle, at least one of the strainers will be immersed in the lubricating oil to prevent an interruption in the supply of the lubricating oil. In addition, the need to provide a wall around each of the strainers can be eliminated, thereby achieving a reduction in size of the transmission case and to easily insure the lowest height of the vehicle above the ground and further to increase the freedom of location of the gear trains.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 8 illustrate a first embodiment of the present invention, wherein

FIG. 1 is a side elevation view, with portions in section, of the transmission of the first embodiment of this invention;

FIG. 2 is a sectional view taken along a line II—II in FIG. 1;

FIG. 3 is a sectional view taken along a line III—III in FIG. 1;

FIG. 4 is a sectional view taken along a line IV—IV in FIG. 2;

FIG. 5 is a sectional view taken along a line V—V in FIG. 2;

FIG. 6 is an enlarged view of a portion of FIG. 2;

FIG. 7 is a sectional view taken along a line VII—VII in FIG. 6; and

FIG. 8 is an exploded perspective view of a retainer;

FIGS. 9 to 13 illustrate a second embodiment of the present invention, wherein

FIG. 9 is a longitudinal sectional side view, similar to FIG. 1, of the transmission of the second embodiment of this invention;

FIG. 10 is a sectional view taken along a line X—X in FIG. 9;

FIG. 11 is an enlarged sectional view taken along a line XI—XI in FIG. 10;

FIG. 12 is a sectional view of two pumps, taken along a line XII—XII in FIG. 11;

FIG. 13 is a front view illustrating a case for the pumps.

DESCRIPTION OF THE PREFERRED EMBODIMENTS

A first embodiment of the present invention will now be described in connection with FIGS. 1 to 8.

Figure 1:
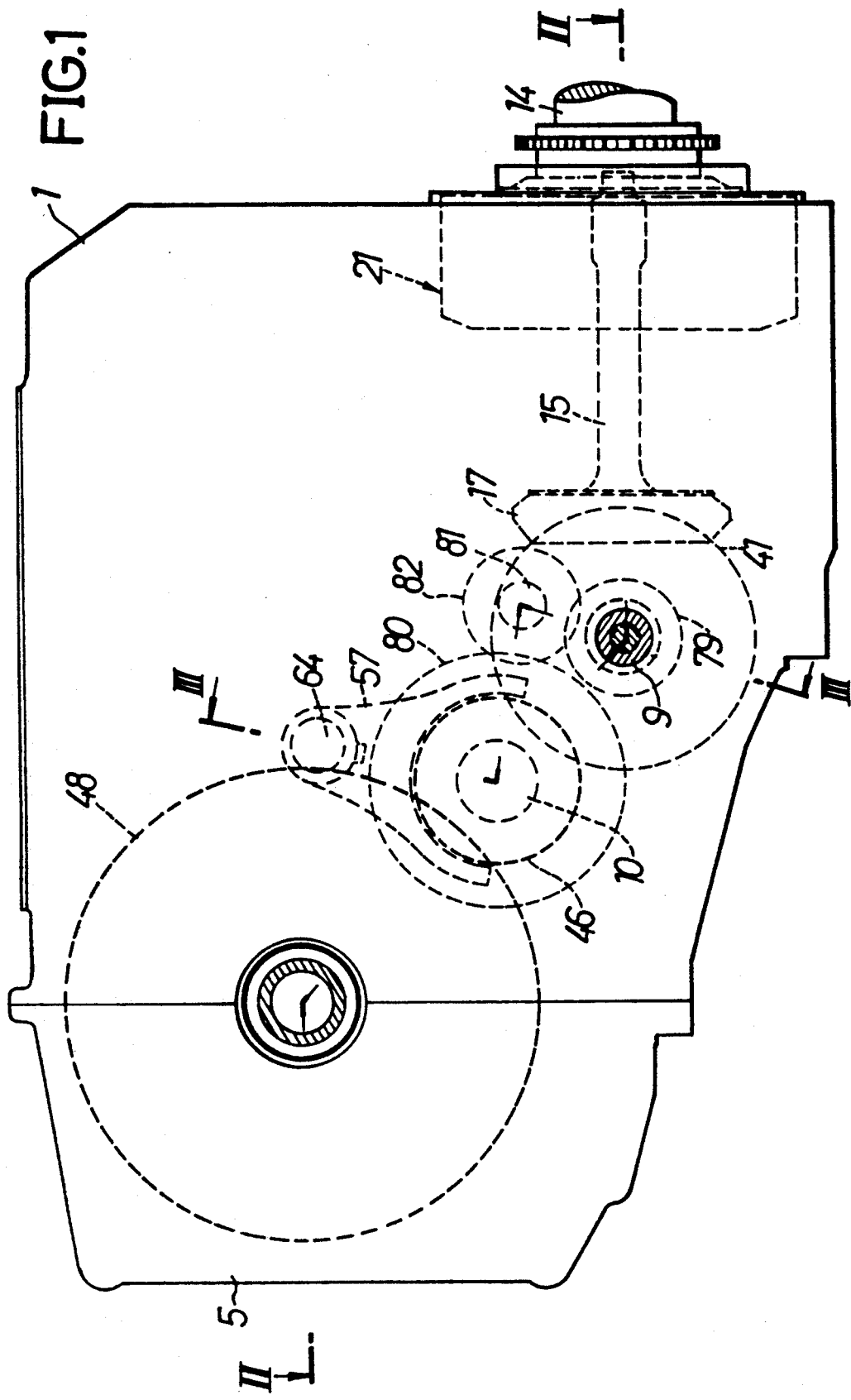
Figure 2:
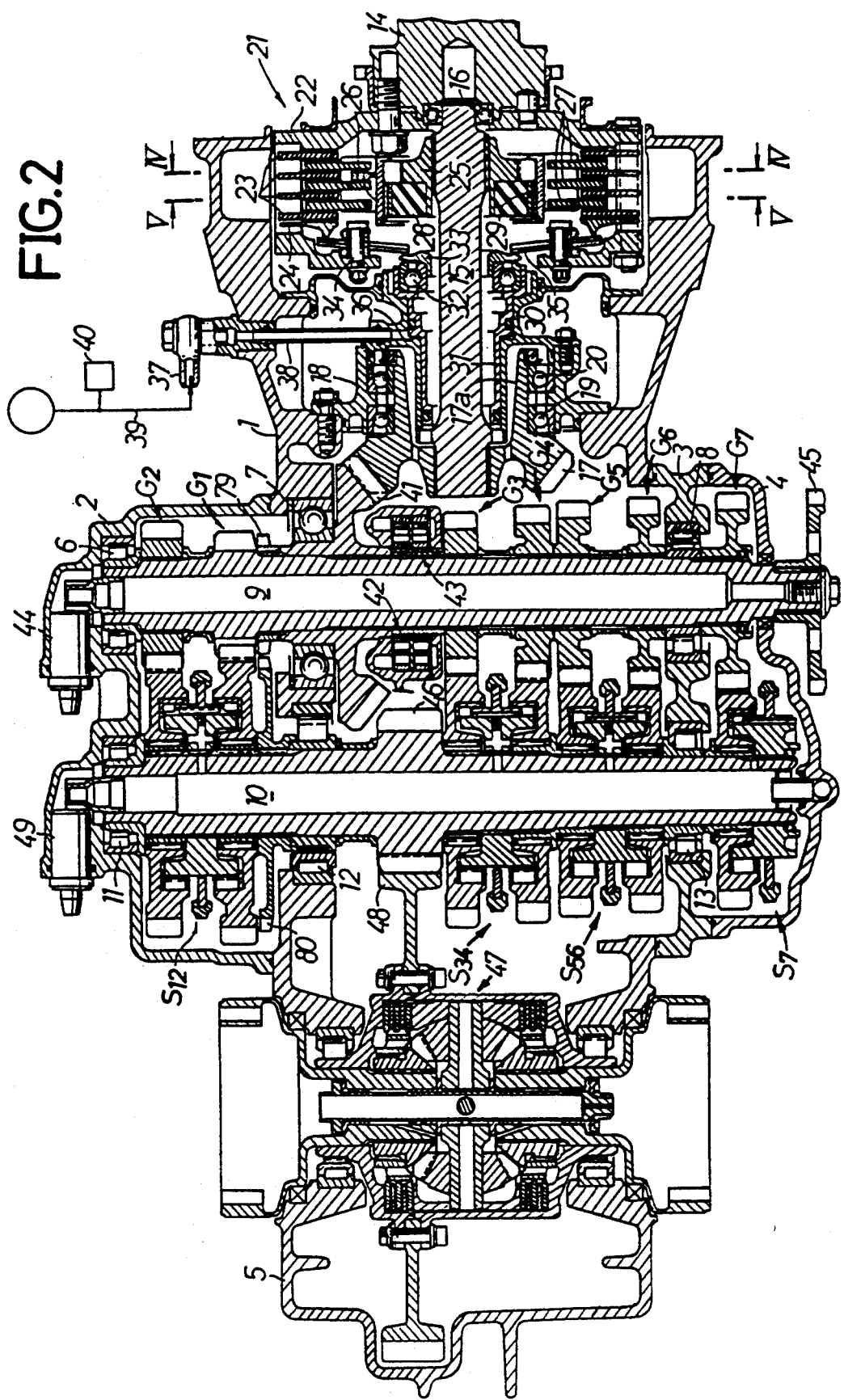
Figure 3:
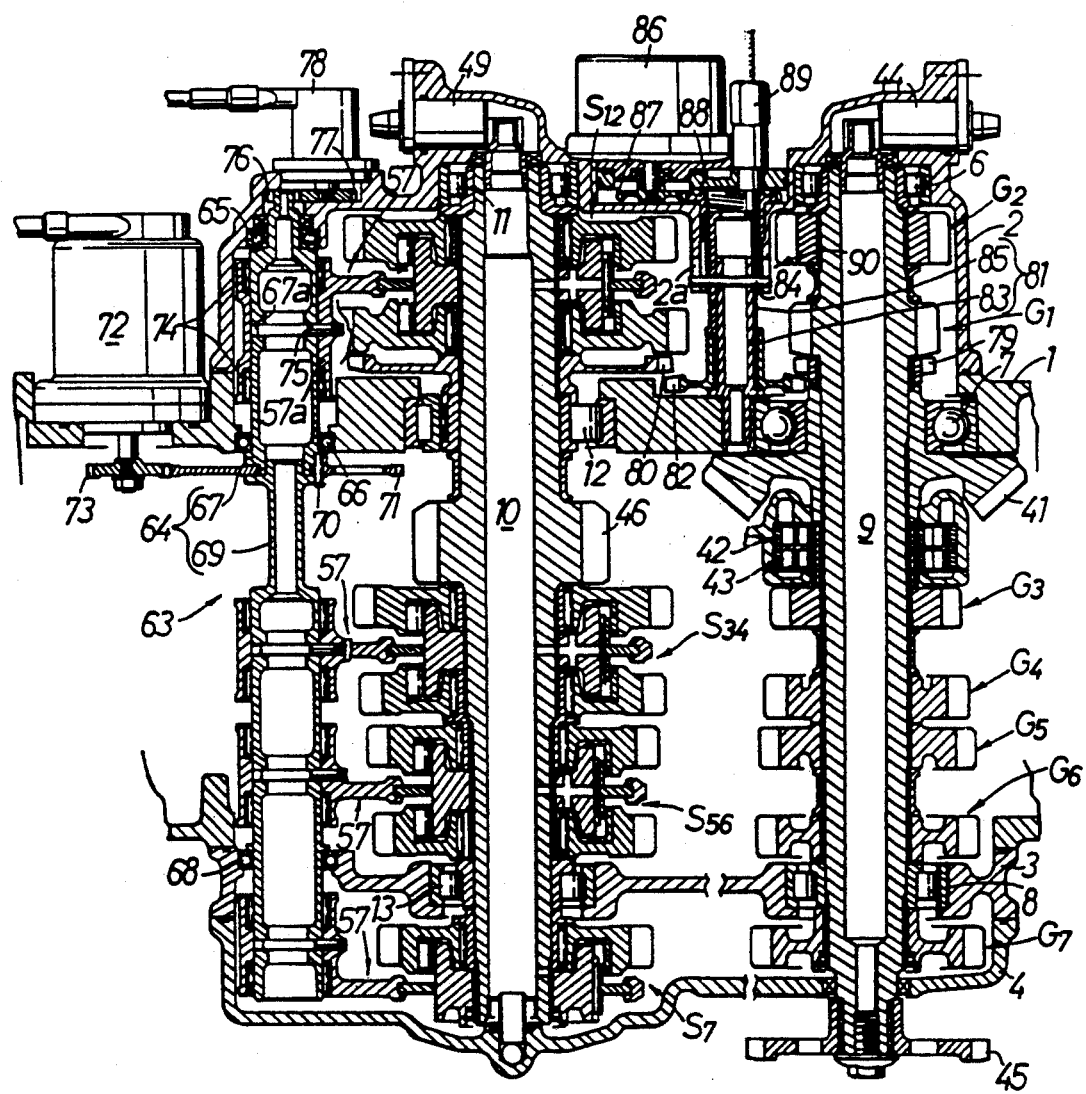

Referring to FIGS. 1 to 3, a transmission for a vehicle according to the first embodiment comprises a body casing 1 disposed in a longitudinal direction of a vehicle body. The body casing 1 has a left side opening covered with a left casing 2, a right side opening covered with a right casing 4 through an intermediate casing 3, and a rear opening covered with a rear casing 5. A main shaft 9 is supported in a lateral direction of the vehicle body at a central portion of the body casing 1 through a roller bearing 6 mounted on the left casing 2, a ball bearing 7 mounted on the body casing 1 and a roller bearing 8 mounted on the intermediate casing 3. A counter shaft 10 is supported rearwardly of and above the main shaft 9 in parallel to the latter through roller bearings 11, 12 and 13 mounted on the left casing 2, the body casing 1 and the intermediate casing 3, respectively.

The rear end of the engine crankshaft 14 is disposed in a direction perpendicular to the main shaft 9 and the counter shaft 10, i.e., along a center line of the vehicle body and opposed to the front opening of the body casing 1. A transmission input shaft 15 is coaxially supported at its front end on the rear end of the crankshaft 14 with a ball bearing 16 interposed therebetween. A driving bevel gear 17 is coupled to a rear end of the transmission input shaft 15 and supported on an annular bracket 18 mounted on the body casing 1 with two ball bearings 19, 20 interposed therebetween. This ensures that the crankshaft 14 and the transmission input shaft 15 are coaxially aligned, relatively rotatable and supported to intersect with the main shaft 9 and counter shaft 10 at right angles. By disposition of the main shaft 9 and the counter shaft 10 in a lateral direction of the vehicle body to intersect, at right angles, with the crankshaft extending in the longitudinal direction along the center line of the vehicle body, the size of the transmission in the axial direction of the crankshaft 14 can be reduced, leading to an increased freedom of mounting of the transmission in the vehicle body.

The structure of a wet multi-plate type clutch 21 interposed between the crankshaft 14 and the transmission input shaft 15 will now be described in detail with reference to FIGS. 1 to 3 along with FIGS. 4 and 5. A clutch outer 22 is coupled to the rear end of the crankshaft 14 in a manner that the clutch outer is fitted into the front opening of the body casing 1. Four clutch disks 23 and a single pressure plate 24 are axially slidably carried in the clutch outer 22. A clutch inner is disposed on an inner periphery of the clutch outer 22 and is comprised of a damper hub inner 25 spline-connected to the transmission input shaft 15 and a damper hub outer 26 which is carried on an outer periphery of the damper hub inner 25 for slight rotation relative to each other. Three clutch disks 27 are axially slidably carried in the damper hub outer 26 and clamped by the four clutch disks 23 in the clutch outer 22.

Figure 4:
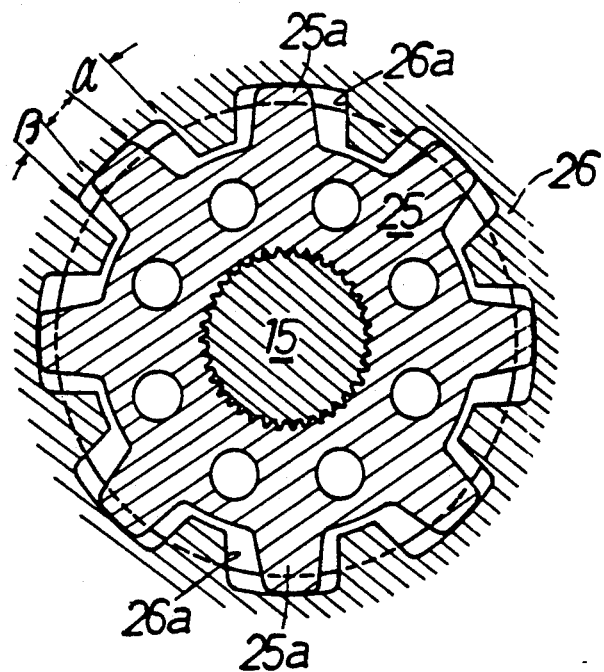
Figure 5:
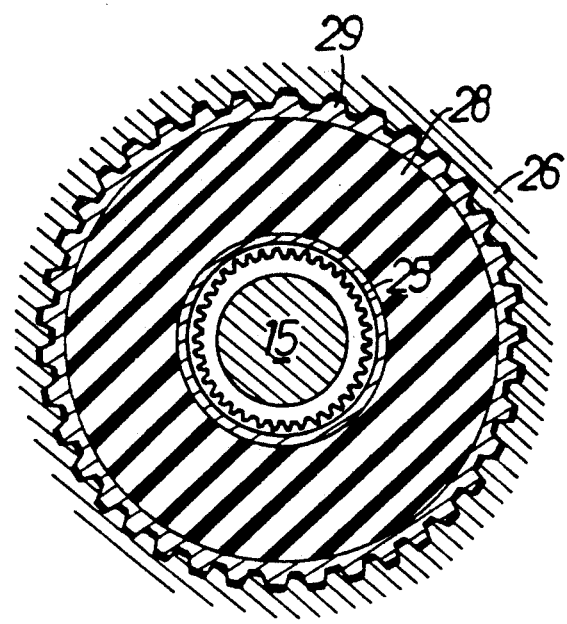

As can be seen from FIG. 4, eight projections 25a are formed around the outer periphery of the damper hub inner 25 and loosely fitted in eight recesses 26a provided in an inner periphery of the damper hub outer 26. Consequently, a clearance of an angle $\alpha$ is provided between each of the projections 25a of the damper hub inner 25 and the corresponding recesses 26a of the damper hub outer 26 and are adapted to be reduced in spacing during an increase in the speed of the vehicle, i.e., when a driving force is transmitted from the engine toward driving wheels. A clearance of an angle $\beta$ is provided between each of the projections 25a of the damper hub inner 25 and corresponding one of the recesses 26a of the damper hub outer 26 and adapted to be reduced in spacing during a reduction in the speed of the vehicle, i.e., when the driving force is transmitted from the driving wheels toward the engine. An annular damper rubber 28 is mounted between the damper hub inner 25 and the damper hub outer 26 which are loosely fitted with each other to damp the relative rotation of both the damper hub inner 25 and the damper hub outer 26. More specifically, an inner periphery of the damper rubber 28 is fixed to rear portions of the projections 25a of the damper hub inner 25 by baking and a ring member 29 to which an outer periphery of the damper rubber 28 is fixed by baking is spline-connected to an inner periphery of the damper hub outer 26. Thus, if a rapid torque is applied from the engine side or the driving wheel side to the clutch 21, the damper hub inner 25 and the damper hub outer 26 are relatively rotated in a range of the angle $\alpha$ or angle $\beta$ to elastically deform the damper rubber 28, thereby damping the shock produced, for example, during engagement of the clutch 21. Reception of the damper rubber 28 in an internal space in the clutch outer 22 makes it possible to add a damper function without an increase in the overall size of the clutch 21.

A release cylinder 30 of the clutch 21 is fixed to the annular bracket 18 supported on the body casing 1. The release cylinder 30 is supported in such a manner that it covers an outer periphery of the transmission input shaft 15 and is received in a recess 17a provided in the driving bevel gear 17. A release piston 31 is received in the release cylinder 30 for axial sliding movement so as likewise to cover the outer periphery of the transmission input shaft 15. A release hub 33 is carried on a front end of the release piston 31 with a release bearing 32 interposed therebetween. The release hub 33 is pivotally supported at its intermediate portion on the clutch outer 22 by a pin 34 and abuts against an inner periphery of a diaphragm spring 35 having an outer periphery abutting against the pressure plate 24. An oil passage 39 is defined between the release cylinder 30 and the release piston 31 for permitting the supply of a pressure oil via a coupling 37 and a pipe 38 to an annular chamber 36, and a pressure sensor 40 is provided in the oil passage 39 for detecting the magnitude of an oil pressure in the oil passage 39. Since the release cylinder 30 and the release piston 31 of the clutch 21 are fitted over the outer periphery of the transmission input shaft 15 and received in the recess 17a in the driving bevel gear 17 in the above manner, the release mechanism is very compact.

When no hydraulic pressure is applied to the oil chamber 36, since the pressure plate 24 is urged rightwardly by a resilient force of the diaphragm spring 35, the clutch disks 23 and 27 are brought into close contact with one another to provide the engagement of the clutch 21. On the other hand, if pressure oil is supplied to the oil chamber 36, the release piston 31 is moved rightwardly to swing the diaphragm spring 35 about the pin 34 through the release bearing 32 and the release hub 33, whereby a surface pressure between the clutch disks 23 and 27 is removed to release the engagement of the clutch 21. The engagement and disengagement of the clutch 21 are monitored by the pressure sensor 40 provided in the oil passage 39.

As can be seen from reference again to FIGS. 1 to 3, a first gear train $G_1$ to a seventh gear train $G_7$ are provided on the main shaft 9 and the counter shaft 10. These gear trains $G_1$ to $G_7$ are arranged in such a manner that the first and second gear trains $G_1$ and $G_2$ are disposed on the left side of the center line of the transmission, i.e., of the crankshaft 14 and the transmission input shaft 15, while the third gear train $G_3$ is in the center and the fourth to seventh gear trains $G_4$ to $G_7$ are disposed on the right side. Since the gear trains are disposed in this divided manner on the laterally opposite sides of the crankshaft 14, it is possible to easily conduct the maintenance of the first and second gear trains $G_1$ and $G_2$ by removing the left casing 2 and to easily conduct the maintenance of the third to seventh shift gear trains $G_3$ to $G_7$ by removing the intermediate casing 3 or the right casing 4.

A follower bevel gear 41 is spline-connected to the main shaft 9 to lie between the first and third gear trains $G_1$ and $G_3$ and is meshed with the driving bevel gear 17 provided on the transmission input shaft 15. Two hydraulic pumps 42 and 43, each comprising a roller vane pump, are juxtaposed in a tandem fashion on the right side of the follower bevel gear 41. A revolution speed sensor 44 is mounted at the left end of the main shaft 9 for detecting the revolution speed of the main shaft 9. A starting gear 45 is mounted at the right end of the main shaft 9 and connected to an external starter motor which is not shown.

An output gear 46 is formed on the counter shaft 10 to lie between the first and third gear trains $G_1$ and $G_3$ and is meshed with an input gear 48 of a conventional differential 47 enclosed by the rear end of the body casing 1 and a rear cover 5. A revolution speed sensor 49 is mounted at the left end of the counter shaft 10 for detecting the revolution speed of the counter shaft 10. A roller synchro mechanism $S_{12}$ is provided between the first and second gear trains $G_1$ and $G_2$ for selectively establishing a first shift stage and a second shift stage. A roller synchro mechanism $S_{34}$ is provided between the third and fourth gear trains $G_3$ and $G_4$ for selectively establishing a third shift stage and a fourth shift stage. A roller synchro mechanism $S_{56}$ is provided between the fifth and sixth gear trains $G_5$ and $G_6$ for selectively establishing a fifth shift stage and a sixth shift stage. A roller synchro mechanism $S_7$ is provided in the vicinity of the seventh gear train $G_7$ for establishing a seventh shift stage. The concentrative disposition of the roller synchro mechanisms $S_{12}$ to $S_7$ on the counter shaft 10 allows a very compact transmitting mechanism. More specifically, the gears on the counter shaft 10 are larger in diameter than the gears on the main shaft 9 and therefore a reduction in size of the transmitting mechanism is achieved by locating the roller synchro mechanisms $S_{12}$ to $S_7$ between gears on the counter shaft 10.

The above-described four roller synchro mechanisms $S_{12}$ to $S_7$ have substantially same structure and hence, the structure of only a representative one of the roller synchro mechanisms $S_{12}$ will be described below in detail.

Figure 6:
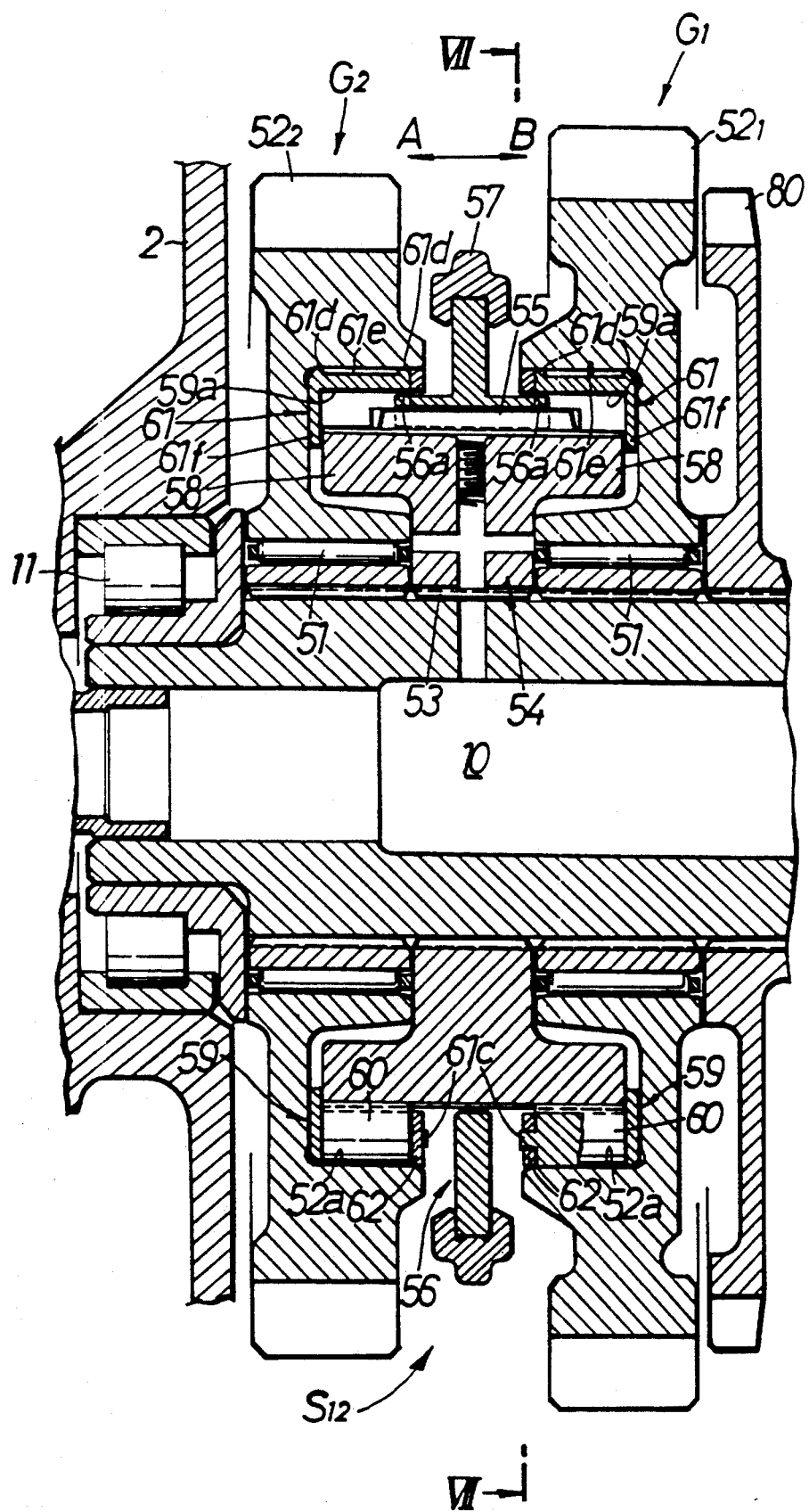

As shown in FIG. 6, a gear $52_1$ of the first gear train $G_1$ is relatively rotatably carried on the counter shaft 10 with a needle bearing 51 interposed therebetween, and a gear $52_2$ of the second shift gear train $G_2$ is relatively rotatably carried on the counter shaft 10 in a location axially spaced from the gear $52_1$ by a predetermined distance with another needle bearing 51 interposed therebetween. Between the gears $52_1$ and $52_2$, a sleeve 56 is axially slidably carried through a spline 55 on an outer periphery of a boss 54 which is coupled to the counter shaft through a spline 53. Axial movement of the sleeve 56 by a shift fork 57 causes the gear $52_1$ of the first gear train G, or the gear $52_2$ of the second gear train $G_2$ to be brought into integral engagement with the counter shaft 10, thereby selectively establishing the first shift stage or the second shift stage. It should be noted that the spline 55 and the sleeve 56 are in engagement with each other in a recess-projection fashion, but it is possible to reverse such recess-projection relationship.

Figure 7:
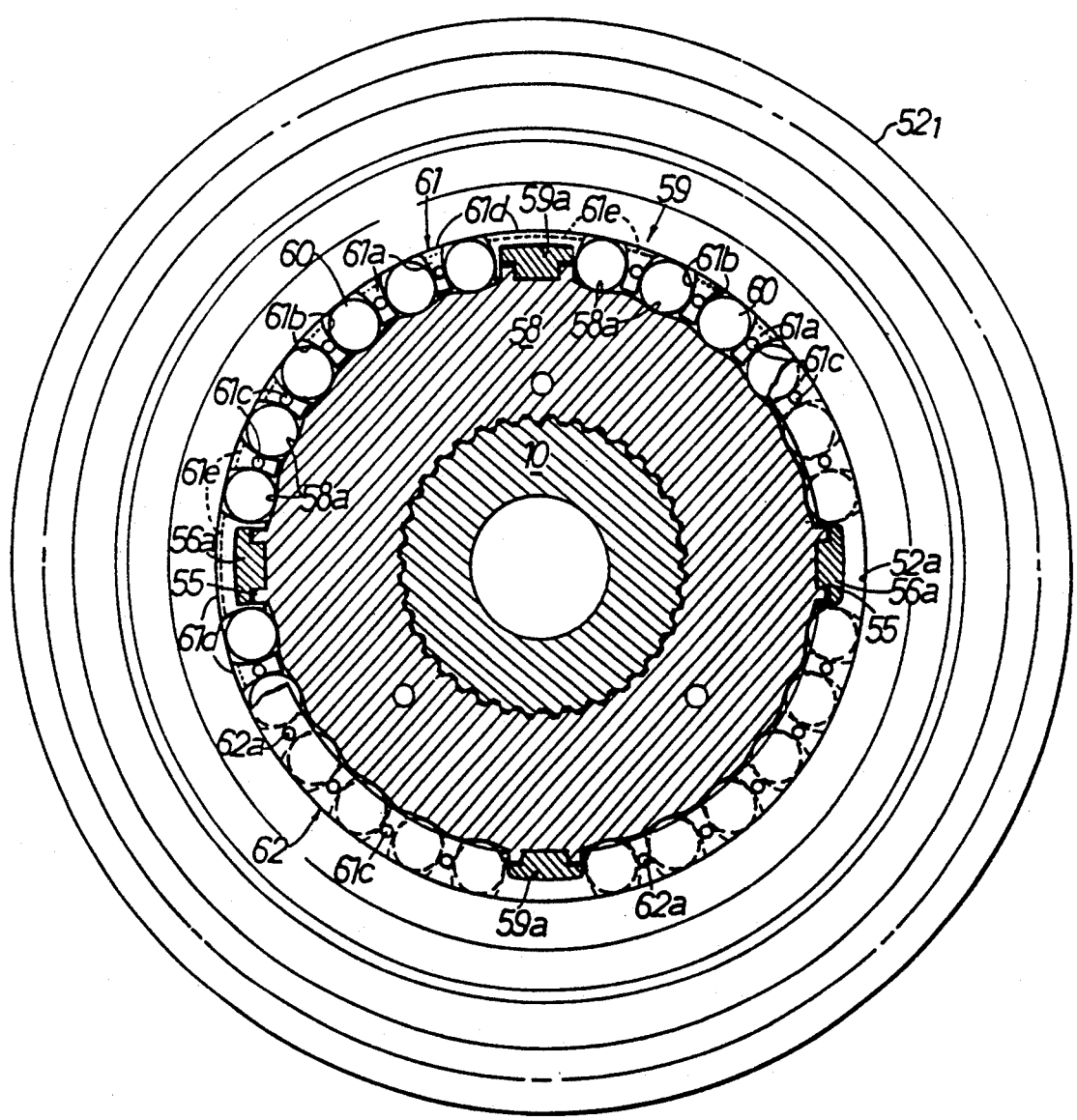

As can be seen from reference also to FIG. 7, a recess is provided in the side of gear $52_1$ of the first gear train $G_1$, and a ring-like inner cam 58 is integrally formed on the side of the boss 54 to lie in such recess. A large number of triangular cam grooves 58a are provided in an outer periphery of the inner cam 58. A large number of rollers 60 are disposed between the cam grooves 58a and a roller abutment surface 52a around an outer periphery of the recess of the gear $52_1$ and are retained by a retainer 59.

Figure 8:
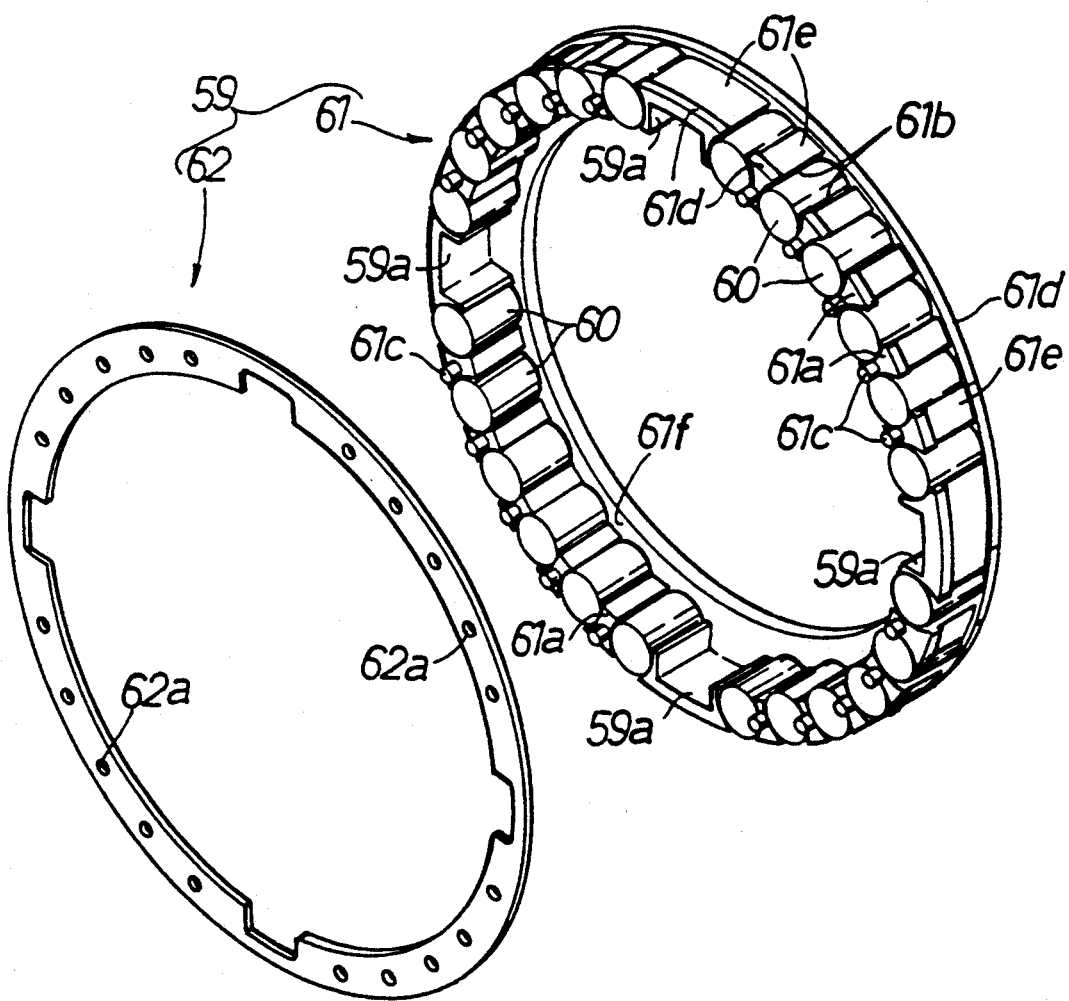

As can be seen from reference also to FIG. 8, the retainer 59 is a ring-like member relatively rotatably received in the recess of the gear $52_1$ and comprised of two components, i.e., a body portion 61 and a cover plate 62. The body portion 61 is provided with roller retaining grooves 61b each defined between adjacent two of a large number of connections 61a to retain the roller 60 for slight movement in a radial direction. An inner surface of each of the roller retaining grooves 61b, i.e., a surface opposed to the outer periphery of the roller 60, is formed by an arcuate surface having a radius of curvature larger than the radius of the roller 60, whereby the angle of a corner formed by the roller abutment surface 52a and the roller retaining groove 61b is acute. A projection 61c is formed on a side of the connection 61a. The body portion 61 and the cover plate 62 are integrally coupled with the rollers 60 retained therein by fitting the projections 61c into holes 62a provided in the cover plate 62 in a caulking manner. Four dowel ingress grooves 59a are provided around an inner periphery of the retainer 59 at 90° spacing to extend axially and open into the side of the retainer 59 closer to the cover plate 62. The formation of the roller retaining groove 61b by the arcuate surface as described above ensures that there is no possibility of the rollers 60 falling out of the roller 61b, leading to a substantially enhanced ability to assemble the retainer 59. Moreover, the roller retaining groove 61b in the body portion 61 requiring the highest accuracy is opened to the joined surface of the cover plate 62 and therefore, the roller retaining groove 61b can be easily machined with a high degree of accuracy.

Such retainer 59 is mounted between the roller abutment surface 52a around the outer periphery of the recess of the gear 52, and the cam surface 58a of the inner cam 58. In order to apply an appropriate frictional force between the gear $52_1$ and the recess to rotate the retainer 59 in such a manner as to follow the gear $52_1$ in such mounting, a sliding-contact portion 61d adapted to be tightly fitted in the recess of the gear $52_1$ is formed around the outer periphery of the body portion 61 of the retainer 59. In addition, a lubricating groove 61e is provided around the outer periphery of the body portion 61 of the retainer 59 and a retaining portion $61_1$ is formed on the body portion 61 to abut against the side of the inner cam 58 in order to restrain the axial movement of the body portion 61.

Four dowels 56a are provided on and project from the side of the sleeve 56 at a spacing of 90°, and they are engaged into and disengaged from the dowel ingress grooves 59a in the retainer 59 by axially moving the sleeve 56 through the spline 55. When the dowels 56a are in engagement in the dowel ingress grooves 59a, the inner cam 58 and the retainer 59 are located in their states shown in FIG. 7, and the roller 60 is fitted in the center of the cam groove 58a.

The structures of the retainer 59 and the inner cam 58 in the second to seventh gear trains $G_2$ to $G_7$ are substantially the same as those in the first gear train $G_1$ and hence, the description thereof is omitted.

As shown in FIG. 3, a shift mechanism 63 for driving each of the roller synchro mechanisms $S_{12}$ to $S_7$ includes a cylindrical shift drum 64 disposed in parallel to and in proximity to upper portions of the main shaft 9 and the counter shaft 10. The shift drum 64 is comprised of a left half 67 supported by a ball bearing 65 mounted on the left casing 2 and a ball bearing 66 mounted on the body casing 1 and a right half 69 supported on the intermediate casing 3 with the ball bearing 68 interposed therebetween. The left and right halves 67 and 69 are coaxially coupled by a pin 70. A driving gear 73 is provided on an output shaft of a pulse motor 72 and is meshed with a follower gear 71 fixed the coupled portion between the halves 67 and 69 by the pin 70, so that the shift drum 64 is rotated accurately through predetermined angles.

A boss portion 57a of the shift fork 57 is axially slidably carried on an outer periphery of the left half 67 of the shift drum 64 with a pair of slide bearings 74 interposed therebetween. A guide pin 75 is embedded radially inwardly in the boss portion 57a and fitted and guided into a cam groove 67a made in an outer periphery of the left half of the shift drum 64. Thus, if the shift drum 64 is rotated by the pulse motor 72, the shift fork 57 with the guide pin 75 guided into the cam groove 67a is slided axially to drive the sleeve 56 of the roller synchro mechanism $S_{12}$ axially to establish a desired shift stage. During this time, the rotation of the shift drum 64 is detected by a shift sensor 78 which is driven through a driving gear 76 and a follower gear 77 mounted at the left end of the shift drum 64.

A mechanism for driving each of the shift forks 57 of the three roller synchro mechanisms $S_{34}$ to $S_7$ mounted at the right half 69 of the shift drum 64 has substantially same structure as the mechanism for driving the shift fork 57 of the roller synchro mechanism $S_{12}$ and hence, the repeated description thereof is omitted. However, of course the shapes of the cam grooves provided in the shift drum 64 to drive the shift forks 57 are different depending upon the individual shift stages.

An increase in rigidity of the shift drum 64 and an improvement in the ability to assemble it can be provided by a construction such that the shift drum 64 is divided into two parts, i.e., the left half on the side of the first and second gear trains $G_1$ and $G_2$ and the right half 69 on the side of the third to seventh gear trains $G_3$ to $G_7$, and the left and right halves are integrally coupled by the pin 70. Moreover, since the gears 71 and 73 for driving the shift drum 64 are provided on an intermediate portion of the shift drum 64, the pulse motor 72 for driving the gears 71 and 73 can be received compactly within the width of the transmission casing without projecting sideways from the transmission casing.

As can be seen from FIGS. 1 and 3, a reverse idle gear 82 carried on a reverse idle shaft 81 mounted above the main shaft 9 and the counter shaft 10 is meshed with a reverse input gear 79 provided on the main shaft 9 and a reverse output gear 80 provided on the counter shaft 10. More specifically, the reverse idle shaft 81 is comprised of an inner shaft portion 83 axially slidably carried on the body casing 1, and an outer shaft portion 85 fitted over the inner shaft 84 and integrally coupled thereto by a pin 84 which is axially slidably engaged in a guide hole 2a provided in the left casing 2. The reverse idle gear 82 is carried on an inner periphery of the inner shaft portion 83 for nonmovement in an axial direction and for relative rotation. A follower gear 88 meshed with a driving gear 87 of a pulse motor 86 mounted on the left casing 2 is threadedly engaged with the outer periphery of the outer shaft portion 85 of the reverse idle shaft 81 through a truncated-conical screw. Thus, if the follower gear 88 is rotated by the pulse motor 86, the outer shaft portion 85, which is threadedly engaged with the follower gear 88 and prevented from being rotated by the pin 84, is moved axially. As a result, the inner shaft portion 83 and the reverse idle gear 82 are also moved axially together with the outer shaft portion 85, and they are put into and out of engagement with the reverse input gear 79 on the main shaft 9 and the reverse output gear 80 on the counter shaft 10. During this time, the meshed state of the reverse idle gear 82 is detected from the axial position of the outer shaft portion 85 by a stroke sensor 89, thereby preventing a biting of the reverse idle gear 82 during idling.

By provision of the reverse transmitting mechanism 90 having the above-described construction separately from the forward transmitting mechanism 63 in this manner, an improvement in reliability in the shifting operation can be provided. In addition, the two revolution speed sensors 44 and 49 for the main shaft 9 and the counter shaft 10 as well as the stroke sensor 89 are compactly disposed on the left casing 2, whereby the maintenance of them can be easily conducted.

The operation of the first embodiment of the present invention having the above-described construction now will be described. The clutch 21 is used only at the start of movement of the vehicle. In a state where a clutch pedal is depressed, the release piston 31 is moved rightwardly by a hydraulic pressure applied to the oil chamber 36 to urge the inner end of the diaphragm spring 35, the clutch disks 23 and 27 are moved away from one another to release the transmission of the driving force. If the clutch pedal is returned from this state, since the clutch disks 23 and 27 are brought into close contact with one another by the resilient force of the diaphragm spring 35, the clutch 21 is brought into its engaged state, thereby permitting the driving force from the crankshaft 14 to be transmitted to the transmission input shaft 15.

At this time, if torque is transmitted from the clutch outer 22 via the clutch disks 23 and 27 to the damper hub outer 26, the latter is slightly moved relative to the damper hub inner 25 which is secured to the transmission input shaft 15. In this movement, any shock due to the engagement of the clutch 21 is damped by deformation of the damper rubber 28 connecting the damper hub outer 26 with the damper hub inner 25. This damping action of the damper rubber 28 is effectively provided not only when the torque is transmitted from the driving wheel side toward the engine, but during shifting by the roller synchro mechanisms $S_{12}$ to $S_7$ which will be described hereinafter.

The first to seventh shift stages and the reverse shift stage are selectively established by driving the pulse motors 72 and 86 on the basis of an electric signal converted from the shifting operation by the driver. For example, if an up-shifting command signal is produced, the engine throttle valve is controlled so that a revolution speed ratio of the shafts 9 and 10 is equal to a value determined from a reduction ratio of a shift stage to be established by up-shifting on the basis of the speed of rotation of the main shaft 9 detected by the revolution speed sensor 44 and the speed of rotation of the counter shaft 10 detected by the revolution speed sensor 49, thereby reducing the speed of rotation of the engine crankshaft.

If the speed of rotation of the main shaft 9 is synchronized with the speed of rotation of the counter shaft 10 by the reduction of the speed of rotation of the engine crankshaft, the shift mechanism 63 is driven to permit an up-shifting operation to be conducted. For example, if the up-shifting is conducted from the first shift to the second shift, then the pulse motor 72 is driven to rotate the shift drum 64 through a predetermined angle. This causes the shift fork 57 to be moved axially through the guide pin 75 which is engaged with the cam groove 67a provided in the outer periphery of the left half 67 of the shift drum 64 to couple the gear $52_2$ of the second shift gear train $G_2$ through the roller synchro mechanism $S_{12}$ to the counter shaft 10, thereby establishing the second shift stage. On the other hand, if a down-shifting command signal is produced, the engine throttle valve is driven so that the speed of rotation of the main shaft 9 is likewise synchronized with the speed of rotation of the counter shaft 10, thereby increasing the speed of rotation of the engine crankshaft. Thereafter, the shift mechanism 63 is driven to establish the desired downshift stage.

The operation of the roller synchro mechanisms $S_{12}$ to $S_7$ will be described below taking the first and second shift roller synchro mechanism $S_{12}$ as an example. When the sleeve 56 is in a neutral position, as shown in FIG. 6, with the right dowel 56a thereof fitted in the dowel ingress groove 59a in the retainer 59 on the side of the gear 52, the inner cam 58 and the retainer 59 are located in their states shown in FIG. 7. As a result, each of the rollers 60 retained by the retainer 59 is movable radially within the roller retaining groove 61b. In such condition, the outer peripheral surface of the retainer 59 and the roller abutment surface of the gear $52_1$ are in a slipping condition and the transmission of torque between the counter shaft 10 and the gear $52_1$ is prevented. At this time, the left dowel 56a of the sleeve 56 is also fitted in the dowel ingress groove 59a in the retainer 59 on the second shift gear $52_2$ and thus, the transmission of torque between the counter shaft 10 and the gear $52_2$ is also prevented.

If the sleeve 56 is moved from this condition in a direction of arrow A in FIG. 6 by the shift mechanism 63 to bring the dowel 56a out of engagement with the dowel ingress groove 59a, the retainer 59 and the inner cam 58 are slightly rotated relative to each other by a torque applied thereto from the counter shaft 10 or the gear $52_1$, thereby causing the rollers 60 to be powerfully urged radially outwardly within the roller retaining grooves 61b by the cam grooves 58a of the inner cam 58 and brought into pressure contact with the roller abutment surface of the gear $52_1$. This permits the inner cam 58 and the gear $52_1$, i.e., the counter shaft 10 and the gear $52_1$ to be brought into integral engagement with each other, thereby establishing the first shift stage. Conversely, if the sleeve 56 is moved in the direction of arrow B, the counter shaft 10 and the gear $52_2$ are brought into integral engagement with each other in a similar manner to establish the second shift stage. In moving the dowels 56a of the sleeve 56 out of the dowel ingress grooves 59a in the retainer 59 to couple the gear $52_1$ to the counter shaft 10, it is necessary to rotate the retainer 59 relative to the inner cam 59 to promptly urge the rollers 60 radially outwardly by the cam grooves 58a in the inner cam 58 in order to enhance the responsiveness. To this end, the body portion 61 of the retainer 59 is provided with the sliding-contact portion 61d which comes into close contact with the recess in the gear $52_1$, and the retainer 59 is rotated in such a manner as to follow the gear $52_1$ by a frictional force applied to the sliding-contact portion 61d, thus promptly coupling the gear $52_1$ with the counter shaft 10.

On the other hand, in inserting the dowels 56a of the sleeve 56 into the dowel ingress grooves 59a in the retainer 59 to release the coupling of the gear $52_1$ with the counter shaft 10, there is no possibility that the roller 60 will bite into the wedge-shaped corner formed by the roller retaining groove 61b in the retainer 59 and the roller abutment surface of the gear $52_1$, because the roller retaining grooves 61b of the body portion 61 of the retainer 59 are formed by an arcuate surface having a radius of curvature larger than the radius of the roller 60. Therefore, the rollers 60 are brought into a free state within the roller retaining grooves 61b concurrently with the insertion of the dowels 56a, and the releasing of the engagement of the gear $52_1$ with the counter shaft 10 is promptly conducted without a time lag.

To establish the reverse shift stage, the reverse idle shaft 81 threadedly engaged with the follower gear 88 is retracted axially by rotating the follower gear 88 meshed with the driving gear 87 of the pulse motor 86. This causes the reverse idle gear 82 to be moved axially together with the reverse idle shaft 81 and meshed with the reverse input shaft 79 on the main shaft 9 and the reverse output gear 80 on the counter shaft 10. As a result, the rotation of the main shaft 9 is transmitted as a rotation in the same direction to the counter shaft 10 via the reverse input gear 79, the reverse idle gear 82 and the reverse output gear 80.

Figure 9:
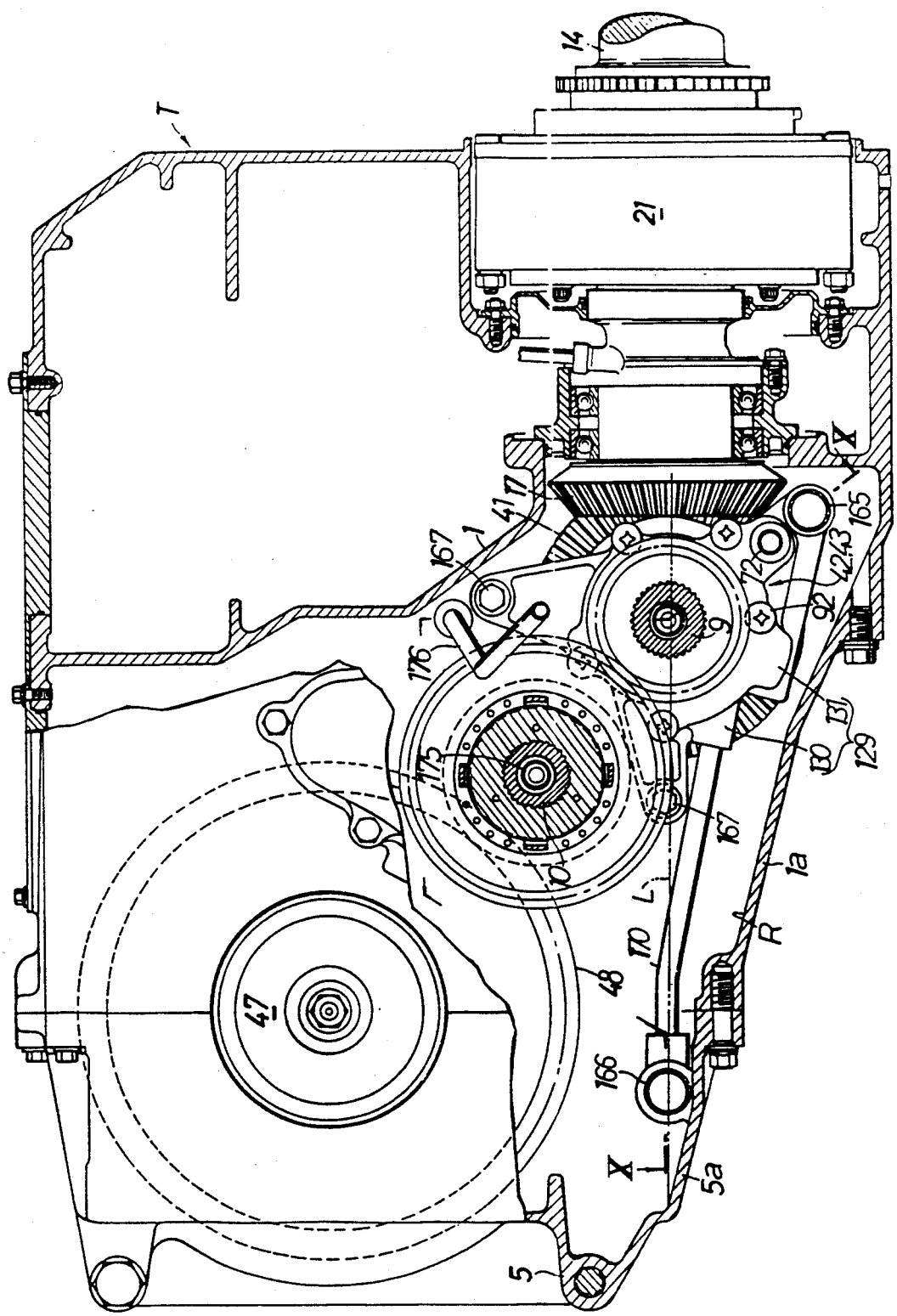
Figure 10:
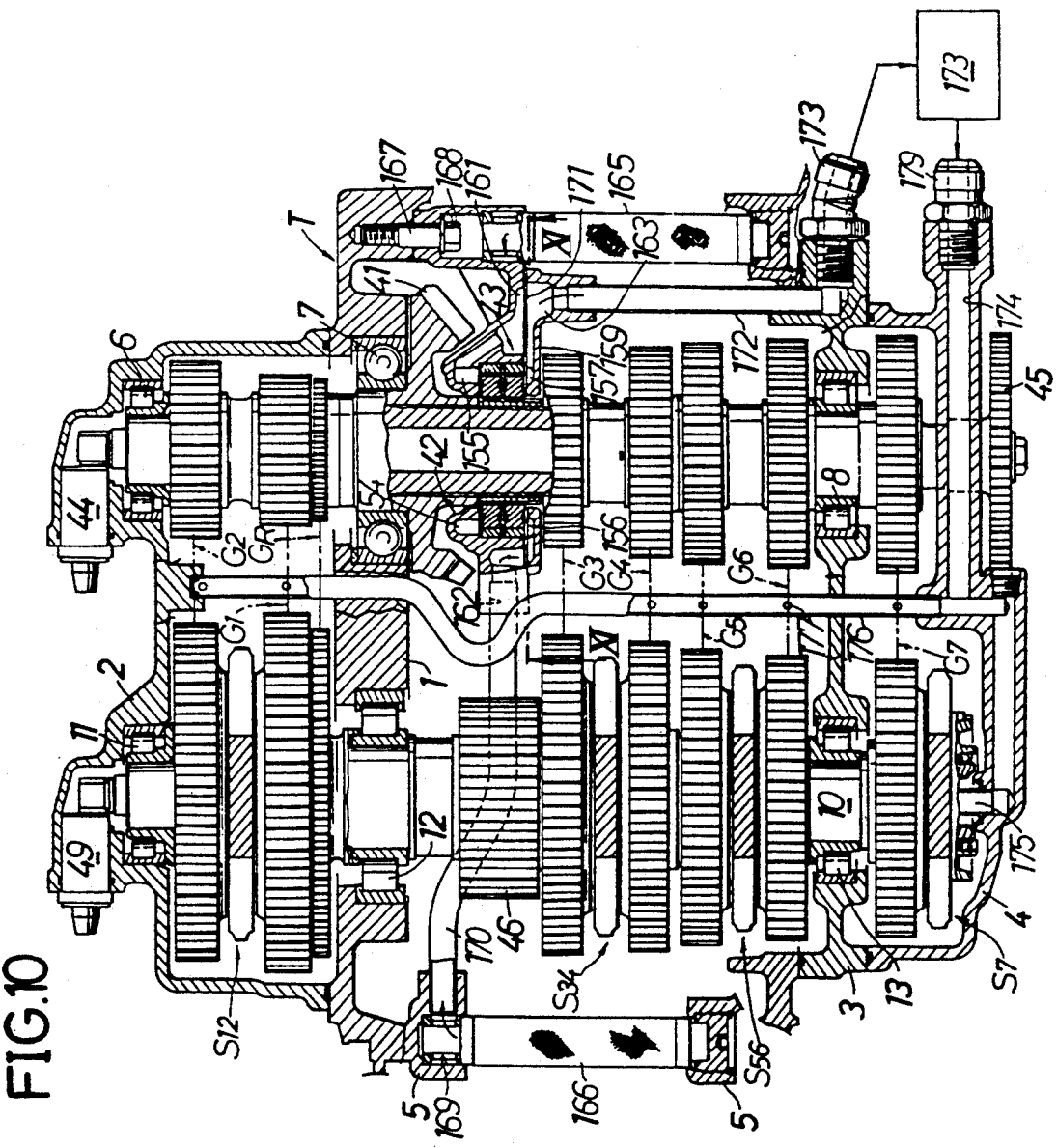

A second embodiment of the present invention will now be described in connection with FIGS. 9 to 13. Referring first to FIGS. 9 and 10, a transmission T for a vehicle according to this second embodiment comprises a main case body 1 disposed in a longitudinal direction of the vehicle, i.e., in the lateral direction as viewed in FIGS. 9 and 10, a left case portion 2 coupled to a left side of the main case body 1, a right case portion 4 coupled to a right side of the main case body 1 through an intermediate case portion 3, and a rear case portion 5 coupled to a rear portion of the main case body 1.

A main shaft 9 extending laterally of the vehicle is disposed to pass a left side wall of the main case body 1 at an intermediate portion in the longitudinal direction of the vehicle. A roller bearing 6 is interposed between one end of the main shaft 9 and the left case portion 2, and a ball bearing 7 is interposed between the left side wall of the main case body 1 and the main shaft 9. A roller bearing 8 is interposed between the intermediate case portion 3 and the main shaft 9. A counter shaft 10 having an axis parallel to the main shaft 9 is disposed rearwardly of add above the main shaft 9, and roller bearings 11, 12 and 13 are interposed between the counter shaft 10 and the left case portion 2, the main case body 1 and the intermediate case portion 3, respectively.

A crankshaft 14 is disposed in a direction perpendicular to the main shaft 9 and the counter shaft 10, i.e., in the longitudinal direction of the vehicle and is connected at its rear end to a driving bevel gear 17 through a wet multi-plate clutch 21 which is disposed at a front portion of the main case portion 1. The driving bevel gear 17 is meshed with a follower bevel gear 41 provided on the main shaft 9. Thus, when the clutch 21 is brought into an engaged state, the power of the crankshaft 14 is transmitted to the main shaft 9 via the clutch 21, the driving bevel gear 17 and the follower bevel gear 41.

First to seventh shift gear trains $G_1$ to $G_7$ and a reverse gear train $G_R$ are provided between the main shaft 9 and the counter shaft 10 and arranged in such manner that the first and second gear trains $G_1$ and $G_2$ and the reverse gear train $G_R$ are located between the main case body 1 and the left case portion 2, while the third to sixth gear trains $G_3$ to $G_6$ are located between the main case body 1 and the intermediate case portion 3, and the seventh shift gear train $G_7$ is located between the intermediate case portion 3 and the right case portion 4. By arranging the gear trains in this manner, the maintenance of the first and second gear trains $G_1$ and $G_2$ and the reverse gear train $G_R$ can be conducted merely by removing the left case portion 2 from the main case body 1, and the maintenance of the third to seventh shift gear trains $G_3$ to $G_6$ can be conducted by removing the intermediate case portion 3 or the right case portion 4 from the main case body 1.

Gears in the first to seventh shift gear trains $G_1$ to $G_7$ on the side of the main shaft 9 are fixed to the main shaft 9, whereas gears on the side of the counter shaft 10 are connected to the counter shaft 10 through roller synchro mechanisms $S_{12}$, $S_{34}$, $S_{56}$ and $S_7$, and one of the gear trains $G_1$ to $G_7$ is selectively established by operation of the individual synchro mechanism $S_{12}$, $S_{34}$, $S_{56}$, $S_7$. An idle gear which is not shown is disposed at an intermediate portion of the reverse gear train $G_R$, and the reverse gear train $G_R$ is established by driving the idle gear by a means similar to the first embodiment but which is not shown here.

A revolution speed sensor 44 is mounted on the left case portion 2 and connected the left end (an upper end as viewed in FIG. 10) of the main shaft 9, and a starting gear 45 is provided at the right end of the main shaft 9 and connected to a starting motor which is not shown. An output gear 46 is provided on the counter shaft 10 to lie between the left side wall of the main case body 1 and the third gear train $G_3$ and is meshed with an input gear 48 of a conventional differential 47. Further, a revolution speed sensor 49 is mounted on the left case portion 2 and connected to the left end of the counter shaft 10.

A bottom 1a of the main case body 1 and a bottom 5a of the rear case portion 5 in the transmission T are formed so that they are connected to each other and inclined downwardly in the forward direction of the vehicle (in the rightward direction as viewed in FIG. 9). This results in an oil reservoir R defined in the transmission T at its lower portion. A lubricating oil is stored in the oil reservoir R in an amount sufficient to provide an oil level L slightly lower than the axis of the crankshaft 14 in a condition in which the vehicle is travelling on a horizontal road surface at a cruising speed.

Pumps 42 and 43 are disposed side by side in an axial direction of the main shaft 9 between the third shift gear train $G_3$ and the follower bevel gear 41 and are driven by the main shaft 9.

Figure 11:
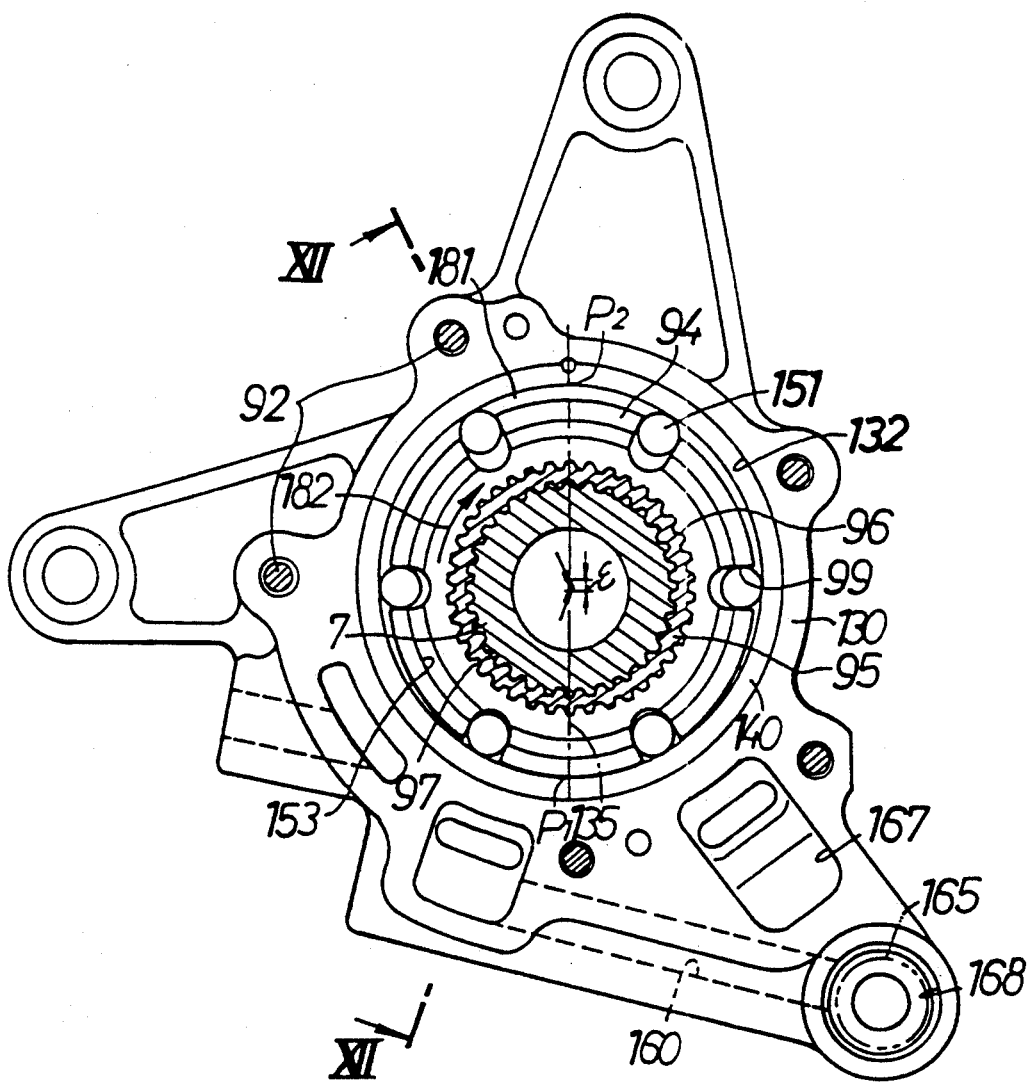
Figure 12:
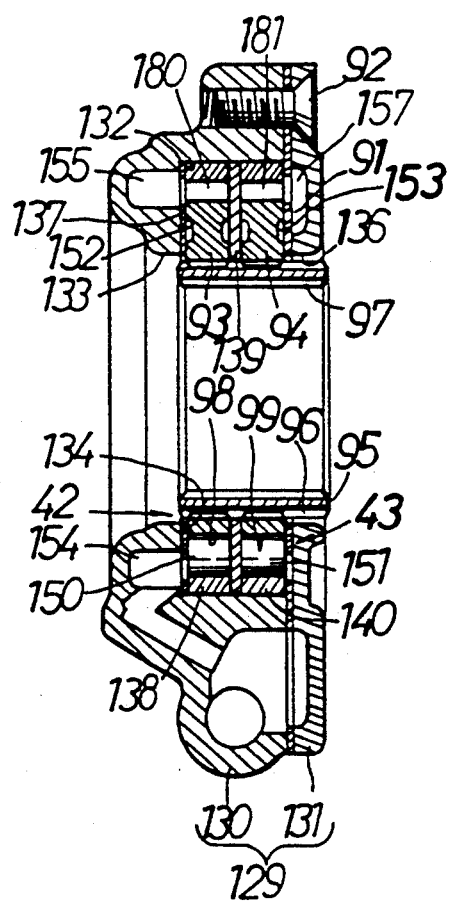
Figure 13:
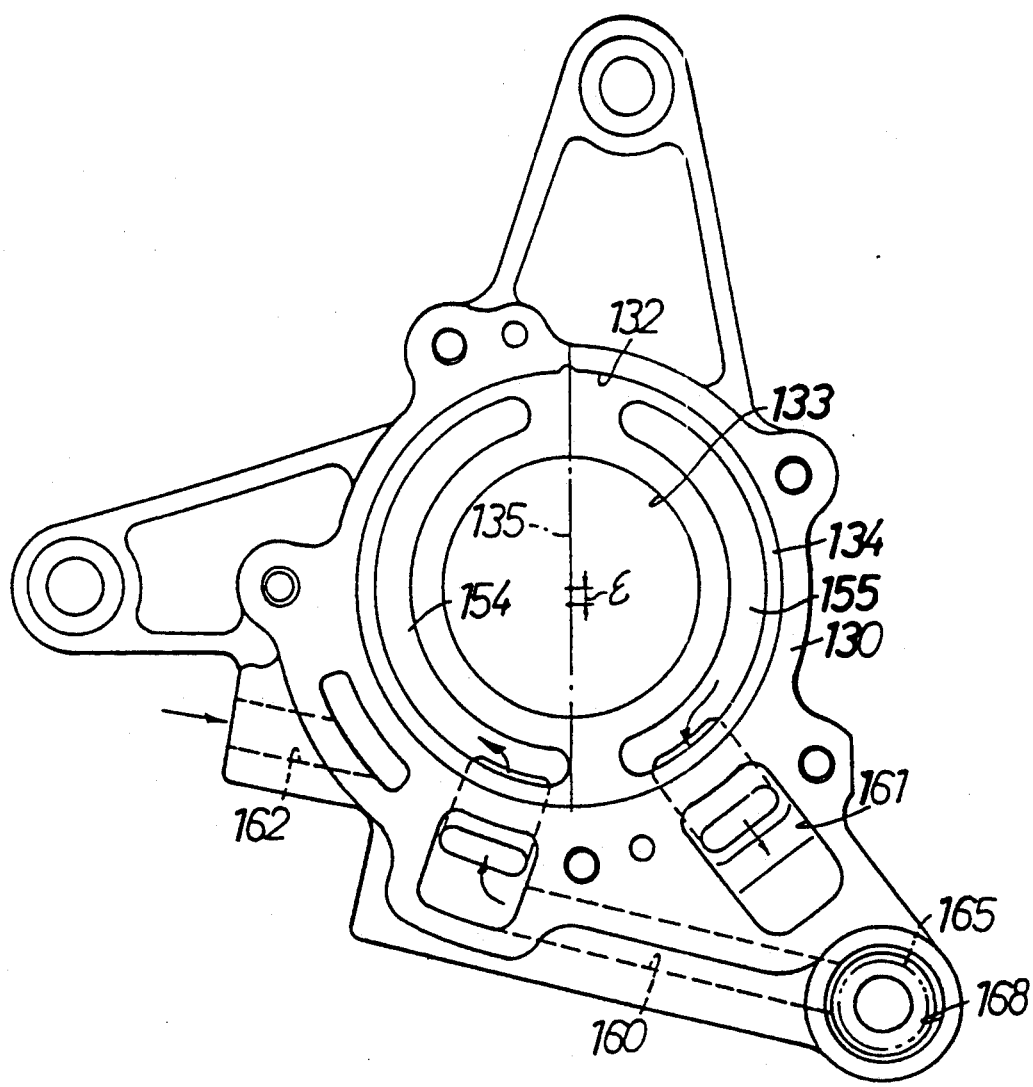

Referring also to FIGS. 11 to 13, the pumps 42 and 43 are roller vane pumps juxtaposed in a tandem fashion in a common casing 129 which is supported on the main case body 1 of the transmission T.

The casing 129 is comprised of a case portion 130 fastened to the main case body 1 by a plurality of bolts 167, and a cover 131 coupled to the case portion 130. The case portion 130 is provided, in sequence from the side of the cover 131, with a large diameter hole 132 and a small diameter hole 133 connected the large diameter hole 132 through a step 134. The large diameter hole 133 is made eccentrically by a distance $\epsilon$ from the center of the small diameter hole 133 along one diametrical line 135 of the smaller diameter hole 133. The cover 131 is also provided at its central portion with a hole 136 substantially corresponding to the small diameter hole 133.

Received in the larger diameter hole 132 in sequence from the side of the step 134 are a left sliding-contact plate 137, a left ring 138, a partition plate 139 and a right ring 140. Moreover, the case portion 130 and the cover 131 are fastened together by a plurality of threaded members 92 to sandwich a right sliding-contact plate 91 therebetween, thereby ensuring that the left sliding-contact plate 137, the left ring 138, the partition plate 139, the right ring 140 and the right sliding-contact plate 91 are fixedly clamped between the case portion 130 and the cover 131 Inner peripheries of the sliding-contact plates 137 and 91 and the partition plate 139 substantially correspond to the smaller diameter hole 133. A left rotor 93 is slidably clamped between the left sliding-contact plate 137 and the partition plate 139, and a right rotor 94 is slidably clamped between the partition plate 139 and the right sliding-contact plate 91.

Each of the rotors 93 and 94 is formed into a ring-like shape coaxial with the main shaft 9 and has an inner periphery coupled to a ring-like hub 95 through a spline 96. An inner periphery of the hub 95 is coupled through a spline 97 to an outer periphery of the main shaft portion 9 passed through the casing 129. Thus, in response to the rotation of the main shaft 9, both the rotors 93 and 94 are also rotated.

The rotors 93 and 94 are provided respectively with pluralities of guide grooves 98 and 99 extending radially at circumferentially spaced apart locations and opened at their outer ends and rollers 150 and 151 are received in the guide grooves 98 and 99, respectively. Annular communication grooves 152 and 153 are provided in opposite surfaces of the corresponding rotors 93 and 94 for each connecting inner ends of adjacent two of the corresponding guide grooves 98 and 99 to each other.

Pump chambers 180 and 181 are defined between the rings 138 and 140 received in the larger diameter hole 132 and the rotors 143 and 144, respectively. The width of each of the pump chambers 180 and 181 is gradually varied in a rotational direction 182 indicated by an arrow in FIG. 11 by reason of the fact that the rings 138 and 140 and the rotors 93 and 94 are eccentric. More specifically, the width of the pump chamber 180, 181 is gradually increased in a range of 180 degrees in the rotational direction 182 from a minimum position $P_1$ defined on the above-described one diametrical line 135 and gradually decreased in a range of 180 degrees from a maximum position $P_2$ to the minimum position $P_2$. Thus, since the rollers 150 and 151 are rolled along inner surfaces of the rings 138 and 140 in response to the rotation of the rotors 93 and 94, respectively, the lubricating oil is drawn into the pump chambers 180 and 181 in their sections from the minimum position $P_1$ to the maximum position $P_2$, and gradually compressed in sections from the maximum position $P_2$ to the minimum position $P_1$.

Arcuate grooves are provided in the step 134 of the case portion 130 on opposite sides of the one diametrical line 135 and define an inlet oil passage 154 and an outlet oil passage 155 in cooperation with the left sliding-contact plate 137. The inlet oil passage 154 communicates with the section of the pump chamber 180 from the minimum position $P_1$ to the maximum position $P_2$ in the rotational direction 182, while the outlet oil passage 155 communicates with the section of the pump chamber 180 from the maximum position $P_2$ to the minimum position $P_1$ in the rotational direction 182. Like the inlet oil passage 154 and the outlet oil passage 155, an arcuate inlet oil passage 156 and an arcuate outlet oil passage 157 are provided between the cover 131 and the right sliding-contact plate 91, respectively. The inlet oil passage 156 communicates with the section of the pump chamber 181 from the minimum position $P_1$ to the maximum position $P_2$ in the rotational direction 182, while the outlet oil passage 157 communicates with the section of the pump chamber 181 from the maximum position $P_2$ to the minimum position $P_1$ in the rotational direction 182.

The case portion 130 is provided with an intake port 160 leading to the inlet oil passage 154, a discharge port 161 leading to the outlet oil passage 155, and an intake port 162 leading to the inlet oil passage 156. The cover 131 is provided with a discharge port 163 leading to the outlet oil passage 157. Moreover, the discharge ports 161 and 163 communicate with each other through a communication hole 171 provided in the right sliding-contact plate 91.

In this manner, the pump 42 is constructed on the left side of the casing 129, while the pump 43 is constructed on the right side of the casing 129, so that the pumps 42 and 43 are operated in response to the rotation of the main shaft 9.

A strainer 165 is disposed in a portion of the oil reservoir R in front of the pumps 42 and 43 within the transmission T and located below the oil level L, and a strainer 166 is disposed in a portion of the oil reservoir R to the rear of the pumps 42 and 43 at a location substantially corresponding to the oil level L. The strainers 165 and 166 are cylindrically shaped to extend in parallel to the axis of the main shaft 9. One end of the strainer 165 is fitted into an insert hole 168 which is provided in the case portion 130 to insert a bolt 167 for fastening the case portion 130 to the main case body 1, and the other end is threadedly received into the right side wall of the main case body 1. One end of the strainer 166 is fitted into a fitting hole 169 provided in the left side wall of the rear case portion 5, and the other end is threadedly received into the right side wall of the rear case portion 5.

The end of the strainer 165 that is fitted into the insert hole 68 is connected to the intake port 160 of the pump 42, and the lubricating oil filtered by the strainer 165 is drawn by the pump 42. One end of an intake pipe 170 is connected to end of the strainer 166 and the other end of the intake pipe 170 is connected to the intake port 162 of the pump 43. Thus, the lubricating oil filtered by the strainer 166 is drawn by the pump 43.

A discharge pipe 172 is provided to extend between the case portion 132 and the right side wall of the main case body 1 and is connected at one end thereof to the discharge port 163 in communication with the discharge port 161 through the communication hole 171 and at the other end thereof to an oil cooler 173 through a connecting pipe 178. The oil cooler 173 is connected through a connecting pipe 179 to an oil passage 174 which is provided in the right case 4.

Provided in the counter shaft 10 is an oil supply passage 175 for supplying a lubricating oil to each of the synchro mechanisms $S_{12}$, $S_{34}$, $S_{56}$ and $S_7$ mounted on the counter shaft 10. The oil supply passage 175 communicates with the oil passage 174.

A further oil supply passage 176 is provided to extend between the left case portion 2 and the right case portion 4 and to pass through the left side wall of the main case body 1 above the meshed-engagement of the gears in the gear trains $G_1$ to $G_7$ and $G_R$ and is connected to the oil passage 174. Moreover, the oil supply passage 176 is provided with a plurality of ejection holes 177 for ejecting the lubricating oil toward such meshed gears.

The operation of the second embodiment of the present invention having the above-described construction now will be described. During operation of the engine, both the pumps 42 and 43 are operated in response to the rotation of the main shaft 9 which is operatively connected to the crankshaft 14, and the lubricating oil stored in the oil reservoir R is filtered in the strainers 165 and 166 and drawn into the pumps 42 and 43. Further, the lubricating oil discharged from the pumps 42 and 43 is cooled in the oil cooler 173 and then supplied from the oil passage 174 via the oil supply passage 175 to the lubricated portions of the synchro mechanisms $S_{12}$, $S_{34}$, $S_{56}$ and $S_7$ and ejected from the plurality of ejection holes 177 in the oil supply pipe 176 to the meshed portions of the gears in the gear trains $G_1$ to $G_7$ and $G_R$.

When the vehicle is travelling on a horizontal road surface at a given cruising speed, the oil level L is kept substantially constant, and at least a portion of each of the strainers 165 and 166 is immersed in the lubricating oil, therefore, lubricating oil filtered in the strainers 165 and 166 can be supplied to each of the portions which are to be lubricated. During a rapid increase in the speed of the vehicle, however, there is a possibility that the lubricating oil in the oil reservoir R may be moved rearwardly, resulting in an absence of the lubricating oil around the front strainer 165 which is located at the front end. Nevertheless, since the strainer 166 is located at the rear end and reliably immersed in the lubricating oil, when the lubricating oil is moved rearwardly, the lubricating oil can be drawn into the pump through the strainer 166. During a rapid decrease in the speed of the vehicle, the lubricating oil in the oil reservoir R is moved forwardly, ensuring that the lubricating oil can be reliably drawn into the pump 42 through the strainer 165 which is located in the front end.

In this way, it is possible to prevent the interruption of the supply of lubricating oil by the immersion of at least one of the strainers 165 and 166 in the lubricating oil whether during a rapid increase or decrease of the speed of the vehicle. Therefore, it is unnecessary to provide a wall around the strainer, with the result that the size of the transmission case can be reduced, ensuring the lowest possible height of the vehicle above the ground, and an increase in freedom of location of each of the gear trains $G_1$ to $G_7$ and $G_R$.

Although the embodiments of the present invention have been described above, it will be understood that various modifications in design can be made without departing from the scope of the present invention as defined in claims.

For example, although roller synchro mechanisms have been described as being used in the transmission of the first embodiment, any other synchro mechanism can be used in place of the roller synchro mechanisms. In addition, in place of the wet multi-plate clutch 21, a different type of clutch can be used. Further, although the strainers 165 and 166 have been disposed at a distance from each other in the longitudinal direction of the vehicle, a pair of strainers can be disposed at different levels in a lateral direction of the vehicle to provide for a continuous supply of oil during cornering of the vehicle.

We claim:

1. The transmission for a vehicle comprising
a main shaft to which the rotation of a crankshaft is transmitted,
a counter shaft disposed in parallel to said main shaft,
a plurality of gear trains interposed between said main shaft and said counter shaft,
a shift mechanism for connecting both the shafts by any of the gear trains for establishing a desired shift stage, and
a synchro mechanism for synchronizing the speed of rotation of both said shafts when said shift stage is established,
said main shaft and said counter shaft being disposed perpendicular to an axis of said crankshaft, wherein the axis of said crankshaft intersects intermediate portions of said main shaft and said counter shaft.

2. The transmission for a vehicle according to claim 1, wherein the low speed shift gear trains and the high speed shift gear trains are divided and disposed on opposite sides of said axis.

3. The transmission for a vehicle comprising
a main shaft to which the rotation of a crankshaft is transmitted,
a counter shaft disposed in parallel to said main shaft,
a plurality of gear trains interposed between said main shaft and said counter shaft,
a shift mechanism for connecting both the shafts by any of the gear trains for establishing a desired shift stage, and
a synchro mechanism for synchronizing the speed of rotation of both said shafts when said shift stage is established,
said main shaft and said counter shaft being disposed perpendicular to an axis of said crankshaft, wherein said synchro mechanism is provided on said counter shaft.

4. The transmission for a vehicle according to claim 3, further including a damper mounted on a clutch interposed between said crankshaft and said main shaft for damping the shift shock produced during operation of said synchro mechanism.

5. The transmission for a vehicle comprising
a main shaft to which the rotation of a crankshaft is transmitted,
a counter shaft disposed in parallel to said main shaft,
a plurality of gear trains interposed between said main shaft and said counter shaft,
a shift mechanism for connecting both the shafts by any of the gear trains for establishing a desired shift stage, and
a synchro mechanism for synchronizing the speed of rotation of both said shafts when said shift stage is established,
said main shaft and said counter shaft being disposed perpendicular to an axis of said crankshaft, and
wherein said shift mechanism includes a rotatable shift drum carrying a shift fork which drives the synchro mechanism, said drum being disposed in parallel to said counter shaft.

6. The transmission for a vehicle according to claim 5, wherein said shift drum is connected at its axially intermediate portion to a drive source.

7. The transmission for a vehicle according to claim 5, further including a reverse shift mechanism mounted independent of the shift mechanism between said main shaft and said counter shaft.

8. The transmission for a vehicle comprising
a main shaft to which the rotation of a crankshaft is transmitted,
a counter shaft disposed in parallel to said main shaft,
a plurality of gear trains interposed between said main shaft and said counter shaft,
a shift mechanism for connecting both the shafts by any of the gear trains for establishing a desired shift stage, and
a synchro mechanism for synchronizing the speed of rotation of both said shafts when said shift stage is established,
said main shaft and said counter shaft being disposed perpendicular to an axis of said crankshaft, and
wherein said transmission includes a clutch adapted to couple a clutch outer mounted on an input shaft with a clutch inner mounted on an output shaft through a clutch disk, said clutch inner including a damper hub inner coupled to the output shaft, and a damper hub outer relatively rotatably carried on the damper hub inner to transmit a torque between said damper hub outer and said clutch outer through the clutch disks, an outer peripheral surface of said damper hub inner being connected with an inner peripheral surface of said damper hub outer by an annular damper rubber.

9. The transmission for a vehicle comprising
a main shaft to which the rotation of a crankshaft is transmitted,
a counter shaft disposed in parallel to said main shaft,
a plurality of gear trains interposed between said main shaft and said counter shaft,
a shift mechanism for connecting both the shafts by any of the gear trains for establishing a desired shift stage, and
a synchro mechanism for synchronizing the speed of rotation of both said shafts when said shift stage is established,
said main shaft and said counter shaft being disposed perpendicular to an axis of said crankshaft, and
wherein said transmission includes a clutch disk for transmitting a driving force between input and output shafts, an annular diaphragm spring disposed around axes of said input and output shafts for biasing said clutch disk in an engaging direction thereof, a release hub supported for movement along said axes and connected to an inner periphery of said diaphragm spring, a clutch for releasing the engagement of said clutch disks through said diaphragm spring by movement of said release hub, a hollow release piston slidably received in a release cylinder which is disposed around the axes of said input and output shafts, and an annular oil chamber defined between said release cylinder and said release piston and connected to a hydraulic pressure generating source, said release piston being connected to said release hub.

10. The transmission for a vehicle comprising
a main shaft to which the rotation of a crankshaft is transmitted,
a counter shaft disposed in parallel to said main shaft,
a plurality of gear trains interposed between said main shaft and said counter shaft,
a shift mechanism for connecting both the shafts by any of the gear trains for establishing a desired shift stage, and
a synchro mechanism for synchronizing the speed of rotation of both said shafts when said shift stage is established,
said main shaft and said counter shaft being disposed perpendicular to an axis of said crankshaft, and
further including a pair of coaxially juxtaposed pumps connected to a shaft connected to the crankshaft to supply a lubricating oil in an oil reservoir formed at a lower portion of a transmission case to each of portions to be lubricated in said transmission case, and a pair of strainers which are connected to said pumps, respectively, and disposed in the oil reservoir at a distance from each other in at least either one of longitudinal and lateral directions of the vehicle.

* * * * *